United States Patent
Stach

(10) Patent No.: US 6,530,624 B2
(45) Date of Patent: Mar. 11, 2003

(54) TWO-PIECE WHEEL FOR A MOTOR VEHICLE

(75) Inventor: Jens Stach, Heimsheim (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 41 days.

(21) Appl. No.: 09/809,438

(22) Filed: Mar. 16, 2001

(65) Prior Publication Data

US 2001/0035675 A1 Nov. 1, 2001

(30) Foreign Application Priority Data

Mar. 16, 2000 (DE) .......................................... 100 12 891

(51) Int. Cl.⁷ ............................................... B60B 1/06
(52) U.S. Cl. .......................................... 301/65; 301/66
(58) Field of Search .......................... 301/65–66, 64.02, 301/64.101, 64.704, 64.701, 64.705; 29/894.321, 894.322; 164/98, 92

(56) References Cited

U.S. PATENT DOCUMENTS

| | | | | | |
|---|---|---|---|---|---|
| 4,000,926 A | * | 1/1977 | Wilcox | ....................... | 301/63.1 |
| 4,035,028 A | * | 7/1977 | Wilcox | ....................... | 301/63.1 |
| 4,252,378 A | * | 2/1981 | DeBolt et al. | ............. | 301/63.1 |
| 4,280,736 A | * | 7/1981 | Raudman | .................... | 301/63.1 |
| 4,741,578 A | * | 5/1988 | Viellard | ....................... | 301/63.1 |
| 5,080,444 A | * | 1/1992 | Hopkins et al. | ........... | 301/63.1 |
| 5,249,846 A | * | 10/1993 | Martin et al. | ............... | 301/64.7 |
| 5,538,329 A | * | 7/1996 | Stach | ........................... | 301/65 |
| 5,718,485 A | * | 2/1998 | Stach | ........................ | 301/63.1 |
| 5,879,059 A | * | 3/1999 | Heiler | .......................... | 301/65 |
| 5,992,500 A | * | 11/1999 | Schneider et al. | ........... | 164/98 |
| 6,325,462 B1 | * | 12/2001 | Hummel et al. | .............. | 301/65 |

FOREIGN PATENT DOCUMENTS

| | | |
|---|---|---|
| DE | 41 38 558 C2 | 5/1994 |
| DE | 4430489 C1 | 10/1995 |
| DE | 197 54 959 A1 | 6/1999 |

* cited by examiner

Primary Examiner—S. Joseph Morano
Assistant Examiner—Long B. Nguyen
(74) Attorney, Agent, or Firm—Crowell & Moring LLP

(57) ABSTRACT

The rim spider of a two-piece wheel for a motor vehicle is provided with hollow spokes in which a metal foam core is arranged and remains. The rim spider is connected with a rim by way of weld ring surfaces which are friction welded. The metal foam core is provided in a special manner with a partial core which is supported on a top core of a casting die tool so as to provide positioned bearing in the casting die tool. By way of slides, which are arranged in a distributed manner on a circumference of the rim spider, an influence on heating and cooling behavior, during and after casting, is exercised.

9 Claims, 1 Drawing Sheet

TWO-PIECE WHEEL FOR A MOTOR VEHICLE

This application claims the priority of German application 100 12 891.2, filed Mar. 16, 2000, the disclosure of which is expressly incorporated by reference herein.

BACKGROUND AND SUMMARY OF THE INVENTION

The present invention relates to a two-piece wheel for a motor vehicle having hollow spokes arranged in a rim spider between air openings. The wheel includes a core made of metal foam which remains in the rim spider, and a friction weld between two spaced weld ring surfaces of the rim spider and the rim by which the rim spider and the rim are connected with one another.

A vehicle wheel which is produced in two pieces in a casting die tool, or in which a rim spider is cast and a rim can be produced in a different manner, is known from German Patent Document DE 41 38 558 A1. Connection of the two wheel pieces, such as the rim spider and the rim, takes place by friction welding. Two spaced weld ring surfaces are provided in the rim spider, on which opposite weld ring surfaces of the rim are arranged. Hollow spokes are provided in the wheel. These hollow spokes are formed by a sand core, which is removed after casting. A one-piece vehicle wheel which has metal foam cores remaining in hollow spokes is further known from German Patent Document DE 197 54 959 A1.

It is one object of the invention to provide a two-piece vehicle wheel having a metal foam core which can be integrated in a simple manner in the wheel, and in which wheel pieces can consist of different materials and can easily be connected in a substance-adhering manner.

It is advantageous, for weight reasons, to provide a two-piece wheel with hollow spokes and metal foam cores remaining in hollow spaces. The walls of the hollow spokes and the walls of additional hollow spaces or ring spaces in the wheel can be designed to be thinner because the metal foam core provides the inside of the wheel with a certain stability.

Production of the rim spider in the casting die tool is determined by the support of the metal foam cores in the top core, because it forms the hollow spaces of the spokes in a shaping manner.

For this purpose, a free portion of the metal foam core is supported in a plane at the base of a top core of the casting die tool. The weld ring surfaces of the rim spider are enclosed in this partial core, and the partial core extends to the plane of a hump surface of the rim spider. In this plane, division of the casting die tool into the top core and a bottom core takes place.

A favorable heat balance can be achieved during casting and in a cooling phase by providing the casting die tool with so-called slides which are arranged on the circumference side of the metal foam core or of the rim spider.

Connection of the rim spider with the rim by way of a known friction weld advantageously results in a variety of combination possibilities with respect to the material selection for the rim spider and the rim as well as the metal foam core. The walls surrounding the core, therefore, can have different thicknesses; alternatively, ribs, webs, and similar reinforcements can be provided inside the hollow spokes in addition to the metal foam core.

BRIEF DESCRIPTION OF THE DRAWINGS

An embodiment of the invention is illustrated in the drawings and will be described in detail.

DETAILED DESCRIPTION OF THE INVENTION

Figure 1:
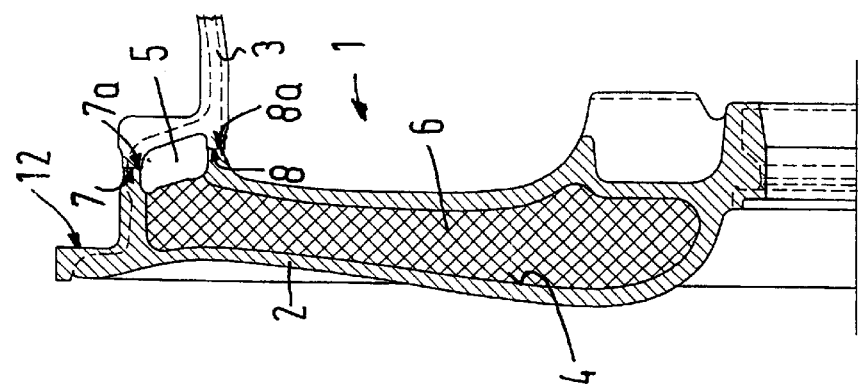
FIG. 1 is a sectional view of a vehicle wheel with a metal foam core.

FIG. 1 illustrates a vehicle wheel 1 having a rim spider 2 and a rim 3. Hollow spokes 4 and ring spaces are provided in the wheel 1, with at least the hollow spokes having metal foam cores 6.

On its outer edge, the rim spider 2 has weld ring surfaces 7, 8. These weld ring surfaces are arranged above one another and are opposed by weld ring surfaces 7a, 8a of the rim 3 for connection.

By way of a core portion 11 (FIG. 2), the metal foam core 6 is positioned in a top core 9 of a casting die tool which is not shown in detail. For this purpose, the core portion 11 extends out of the hollow space of the spoke 4, which is to be formed, between the weld ring surfaces 7, 8. The partial core 11 extends from the plane X—X in the base of the top core 9 to the plane Y—Y which ends at the interior side of the vehicle spider edge 12.

Figure 2:
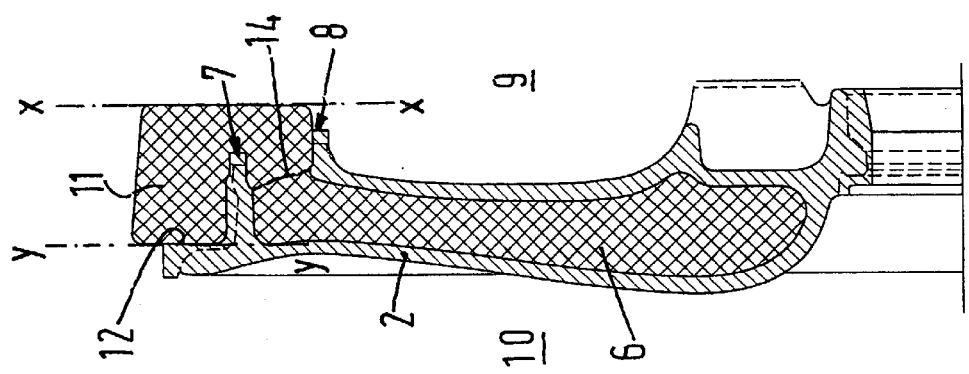
FIG. 2 is a representation of a rim spider of the vehicle wheel with a core portion of the metal foam core positioned in the top core of the casting die tool.
Figure 3:
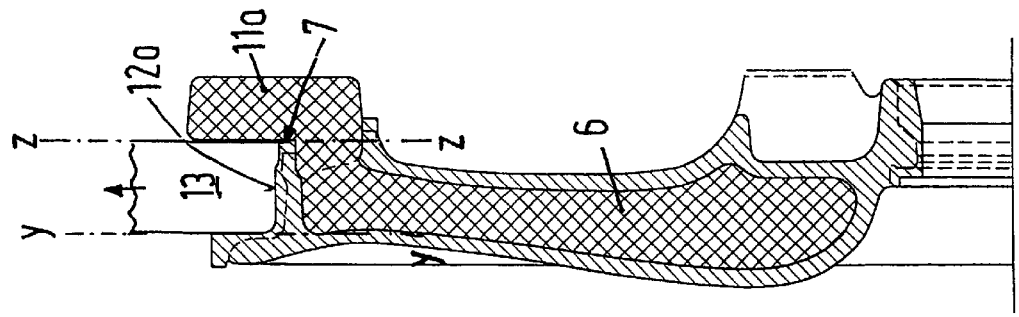
FIG. 3 is different sectional view of the representation of the rim spider with the metal foam core according to FIG. 2 in which the slide of the casting die tool is visible.

FIG. 3 is a different sectional view than FIG. 2. The core portion 11a is reduced in thickness with respect to the core portion 11 by so-called slides 13. The object of providing these slides 13 is to permit a desired heat balance during casting and in the cooling phase.

After casting of the wheel 1, the core portions 11, 11a are cut off along an edge 14. As a result, a ring space 5, which encloses the weld ring surfaces 7, 8 and 7a, 8a, is formed.

The connection of the rim spider 2 with the rim 3 can also take place by way of another type of welding such as, for example, beam welding, plasma jet welding or laser beam welding, or by way of a gluing process.

FIG. 1 illustrates the hollow spoke 4 as having a uniform wall thickness. Because of the metal foam core remaining in the wheel, these wall thicknesses can also have a different construction corresponding to stability requirements. Rib webs, cylindrical attachments or similar reinforcing parts enclosed by the metal foam core are also conceivable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A two-piece wheel for a motor vehicle having hollow spokes which are arranged in a rim spider between air openings comprising:

a core made of a metal foam which remains in the rim spider, and a friction weld between spaced weld ring surfaces of the rim spider and the rim by which the rim spider and the rim are connected with one another, wherein the core made of the metal foam includes at least one core portion which extends out of the openings between the spaced weld ring surfaces of the rim spider so as to be borne in a casting die tool and is to be disposed in the casting die tool, and wherein the core portion is supported in a plane in a base of a top core of the casting die tool and, including at least one of the weld ring surfaces, extends to a plane of a hump surface of said rim spider, and wherein a division of the casting die tool into the top core and a bottom core takes place in the plane of the hump surface.

2. The two-piece wheel according to claim 1, wherein, between theplane of the hump surface and a plane extending through an outer weld ring surface of the rim spider, on a circumference side, several slides arranged in the casting die tool can be supported on an outer ring surface of the rim spider.

3. A two-piece wheel for a motor vehicle having hollow spokes which are arranged in a rim spider between air openings comprising:

a core made of a metal foam which remains in the rim spider, and a friction weld between spaced weld ring surfaces of the rim spider and the rim by which the rim spider and the rim are connected with one another, wherein a ring duct, which is free of the metal foam core, exists in an area between the spaced weld ring surfaces.

4. The two-piece wheel according to claim 1, wherein the rim spider has walls surrounding the metal foam core which have different thicknesses.

5. The two-piece wheel according to claim 2, wherein the rim spider has walls surrounding the metal foam core which have different thicknesses.

6. The two-piece wheel according to claim 3, wherein the rim spider has walls surrounding the metal foam core which have different thicknesses.

7. The two-piece wheel according to claim 1, wherein the rim spider has walls surrounding the metal foam core which have identical thicknesses.

8. The two-piece wheel according to claim 2, wherein the rim spider has walls surrounding the metal foam core which have identical thicknesses.

9. The two-piece wheel according to claim 3, wherein the rim spider has walls surrounding the metal foam core which have identical thicknesses.

* * * * *